United States Patent
Morinaga (10) Patent No.: US 9,567,000 B2
(45) Date of Patent: Feb. 14, 2017

(54) VEHICLE REAR WHEEL STEERING APPARATUS

(71) Applicant: AISIN SEIKI KABUSHIKI KAISHA, Kariya-shi, Aichi-ken (JP)

(72) Inventor: Shinya Morinaga, Chiryu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/135,104

(22) Filed: Apr. 21, 2016

(65) Prior Publication Data

US 2016/0311463 A1 Oct. 27, 2016

(30) Foreign Application Priority Data

Apr. 21, 2015 (JP) .................................. 2015-086373

(51) Int. Cl.
*B62D 5/04* (2006.01)
*B62D 7/15* (2006.01)
*F16H 37/12* (2006.01)

(52) U.S. Cl.
CPC ........... *B62D 5/0421* (2013.01); *B62D 5/0445* (2013.01); *F16H 37/12* (2013.01)

(58) Field of Classification Search
CPC ........................... B62D 5/0421; B62D 5/0445
USPC ........................................................ 180/445
See application file for complete search history.

(56) References Cited

U.S. PATENT DOCUMENTS

| | | | | |
|---|---|---|---|---|
| 5,086,861 A * | 2/1992 | Peterson | ............. | B62D 7/1581 180/445 |
| 5,595,089 A * | 1/1997 | Watanabe | ............ | B62D 5/0427 180/315 |
| 8,011,675 B2 * | 9/2011 | Suyama | ............... | B62D 5/0418 280/5.522 |
| 8,607,920 B2 * | 12/2013 | Jungbecker | ............ | B60G 7/006 180/412 |
| 9,387,874 B2 * | 7/2016 | Fujii | .................... | B62D 5/0406 |
| 2008/0157612 A1 | 7/2008 | Suyama et al. | | |
| 2008/0257081 A1* | 10/2008 | Hakui | .................... | B60G 7/006 74/89.35 |
| 2010/0019465 A1* | 1/2010 | Yuta | ........................ | B60G 3/20 280/86.758 |

FOREIGN PATENT DOCUMENTS

| | | |
|---|---|---|
| JP | H 07-215226 A | 8/1995 |
| JP | 2008-164014 A | 7/2008 |
| JP | 5098242 B2 | 12/2012 |

* cited by examiner

*Primary Examiner* — Tony Winner
(74) *Attorney, Agent, or Firm* — Buchanan Ingersoll & Rooney PC (57) ABSTRACT

A vehicle rear wheel steering apparatus includes: a housing supported by the rear wheels via first and second connection members; an electric motor supported by the housing; a speed reduction mechanism connected to an output shaft of the electric motor, and reducing the speed of an output of the electric motor; and a linear motion mechanism including a nut member connected to the speed reduction mechanism, and a rod screwed to the nut member and connected to at least one of the first and second connection members, and converting rotational motion of the nut member into linear motion of the rod, wherein the speed reduction mechanism includes a planetary gear mechanism, and the speed of an output of the electric motor is reduced and the reduced output is transmitted to the linear motion mechanism.

6 Claims, 6 Drawing Sheets

VEHICLE REAR WHEEL STEERING APPARATUS

CROSS REFERENCE TO RELATED APPLICATIONS

This application is based on and claims priority under 35 U.S.C. §119 to Japanese Patent Application 2015-086373, filed on Apr. 21, 2015, the entire contents of which are incorporated herein by reference.

TECHNICAL FIELD

This disclosure relates to a rear wheel steering apparatus that steers rear wheels of a vehicle.

BACKGROUND DISCUSSION

In recent years, various types of rear wheel steering apparatuses forming a portion of a four wheel steering (4WS) system of a vehicle have been known. Typically, as disclosed in JP 7-215226A (Reference 1), a rear wheel steering actuator is "configured to include an electric motor; a speed reduction mechanism that is connected to an output of the electric motor; and a conversion mechanism that converts output rotational motion of the speed reduction mechanism into linear motion, and transmits the linear motion to an axle (refers to Paragraph [0003] of Reference 1)". The size of the actuator is reduced by inserting and coaxially disposing an actuator shaft into a circular tube-shaped rotator member, and a planetary gear mechanism is used as a speed reduction mechanism for a motor output.

JP 2008-164014A (Reference 2) discloses "an expandable and contractible actuator for the purpose of improving its adaptability for various usages at a low cost (refer to Paragraph [0004] of Reference 2)". In Reference 2, "a first housing is attachably and detachably provided to accommodate a motor of the expandable and contractible actuator, and a second housing is attachably and detachably provided to accommodate a speed reducer and a feed screw mechanism. In a case where specifications of the motor are desired to be changed, or in a case where operational characteristics of the speed reducer or the feed screw mechanism are desired to be changed, it is possible to cope with this case by only replacing a first housing side sub-assembly or a second housing side sub-assembly without changing the entire design of the expandable and contractible actuator, and it is possible to improve the adaptability of various models and to reduce cost (refer to Paragraph [0011] of Reference 2)". Also, in the expandable and contractible actuator disclosed in Reference 2, a planetary gear mechanism is used as a speed reduction mechanism for a motor output. In addition, in a wheel steering apparatus disclosed in Japanese Patent No. 5098242 (Reference 3), a speed reduction mechanism is provided which converts rotational motion of a motor into linear motion and transmits the linear motion to a rod. A planetary gear mechanism is used as an example of the speed reduction mechanism.

In each of the apparatuses disclosed in References 1 and 2, a planetary gear mechanism is used as the speed reduction mechanism for a motor output, and typically, there is a limitation to combinations of the number of teeth of a planetary gear, which allows meshing of gears. In a case where the actuator axis is coaxially disposed as disclosed in Reference 1, the number of teeth of the planetary gear is limited by the diameter of an output rod (the actuator shaft disclosed in Reference 1) and the outer diameter of the actuator, and thus, it is difficult to change a reduction gear ratio. In contrast, in a case where output characteristics of the actuator disclosed in Reference 2 are changed, the scale of a change is smaller compared to the actuator disclosed in Reference 1; however, it is necessary to change a sub-assembly including a housing. As described in Reference 1, the actuator disclosed in Reference 2 cannot adopt a configuration in which an output rod extends out from both sides of the housing.

In contrast, in the planetary gear mechanism disclosed in Reference 3, a metal flat head pin is used as a member that rotatably supports a planetary gear (illustrated in FIG. 2 of Reference 3). The flat head pin, whose head portion serves as a retainer which prevents axial movement of the planetary gear in an axial direction, is commercially available. However, there is no general-purpose pin available which can be used in a rear wheel steering apparatus, and it is necessary to prepare a dedicated design component, thereby causing an increase in cost.

SUMMARY

Thus, a need exists for a vehicle rear wheel steering apparatus which is not suspectable to the drawback mentioned above.

An aspect of this disclosure is directed to a vehicle rear wheel steering apparatus that steers rear wheels of a vehicle, the apparatus including: a housing that is supported by the rear wheels via a first connection member and a second connection member; an electric motor that is supported by the housing; a speed reduction mechanism that is connected to an output shaft of the electric motor, and reduces the speed of an output of the electric motor; and a linear motion mechanism that includes a nut member which is connected to the speed reduction mechanism, and a rod which is screwed to the nut member and is connected to at least one of the first connection member and the second connection member, and that converts rotational motion of the nut member into linear motion of the rod. The speed reduction mechanism includes a planetary gear mechanism including: a drive pulley that is connected to the output shaft of the electric motor; a driven pulley which is connected to the nut member, and is supported by the housing such that the driven pulley can be rotated around an axis of the rod; a belt that is provided in a tensed state between the drive pulley and the driven pulley; a sun gear that is rotated integrally with the driven pulley; a ring gear that is non-rotatably supported inside of the housing; a planetary gear that meshes with the ring gear and the sun gear; a columnar pin that rotatably supports the planetary gear and is fixed to the nut member; and a partition wall portion that separates the driven pulley from the planetary gear, and prevents the planetary gear from being axially moved a predetermined distance or longer. The speed of an output of the electric motor is reduced and the reduced output is transmitted to the linear motion mechanism via the drive pulley, the belt, the driven pulley, and the planetary gear mechanism.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
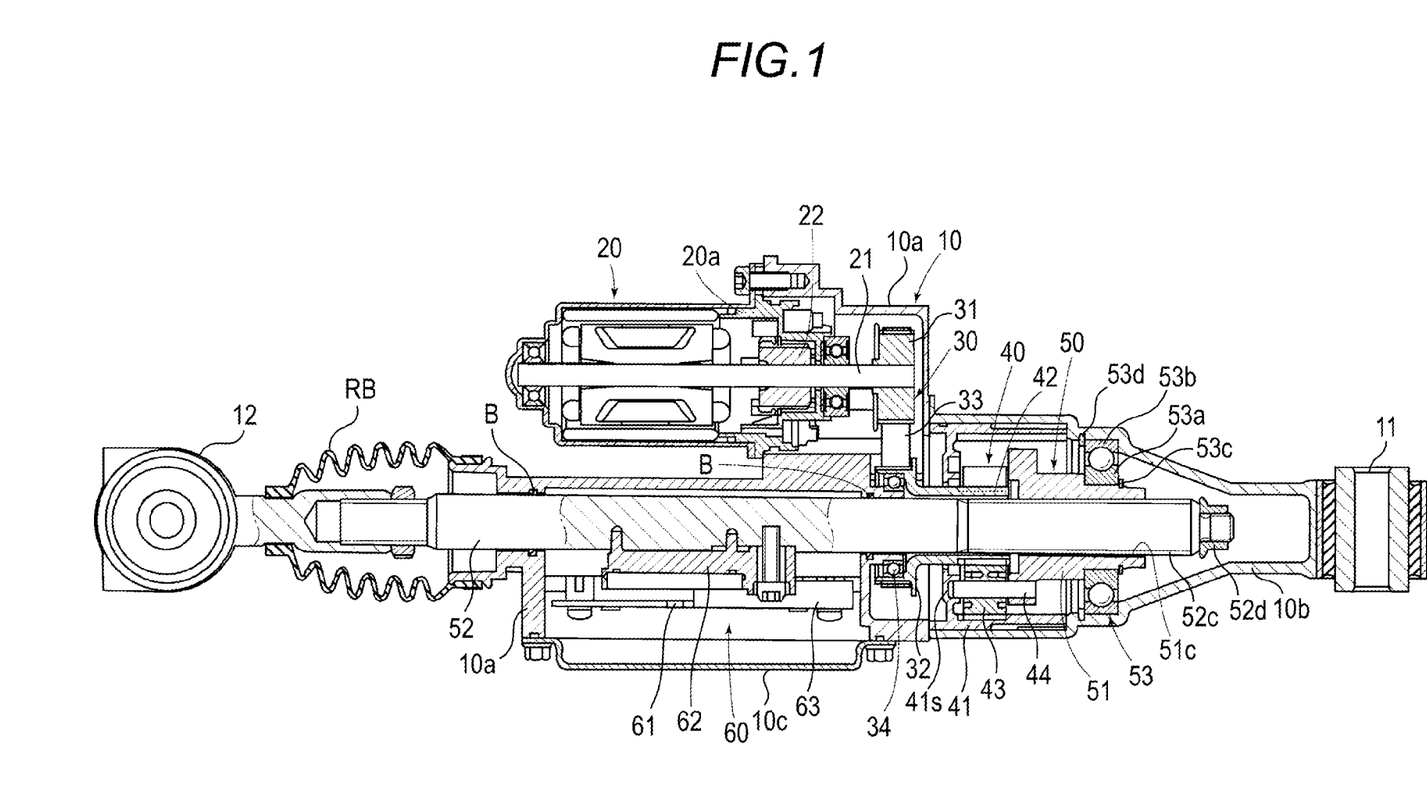
FIG. 1 is a longitudinal sectional view illustrating a rear wheel steering apparatus according to one embodiment disclosed herein.

Hereinafter, preferred embodiments disclosed herein will be described with reference to the accompanying drawings. As illustrated in FIG. 1, in a rear wheel steering apparatus in one embodiment disclosed herein, a housing 10 is supported by rear wheels (not illustrated) of a vehicle via a first connection member 11 and a second connection member 12. The housing 10 accommodates an actuator configured to include an electric motor 20, a belt type speed reduction mechanism 30, a planetary gear mechanism 40, and a linear motion mechanism 50. The housing 10 in the embodiment is configured to include a body portion 10a of the housing; a tubular support portion 10b that is formed integrally with the first connection member 11; and a cover 10c that blocks an opening formed in the body portion 10a. In addition, a rubber boot RB is mounted between the body portion 10a and the second connection member 12.

The body portion 10a supports the electric motor 20, and accommodates the belt type speed reduction mechanism 30. The support portion 10b accommodates the planetary gear mechanism 40 and the linear motion mechanism 50. A rod 52 of the linear motion mechanism 50 is supported by the body portion 10a. One end portion of the rod 52 extends out from the body portion 10a, and is connected to the second connection member 12. A single side expansion and contraction type actuator is configured to be capable of steering the rear wheels by increasing and decreasing the distance between the first connection member 11 and the second connection member 12 via expansion and contraction of the rod 52, which will be described later.

Figure 2:
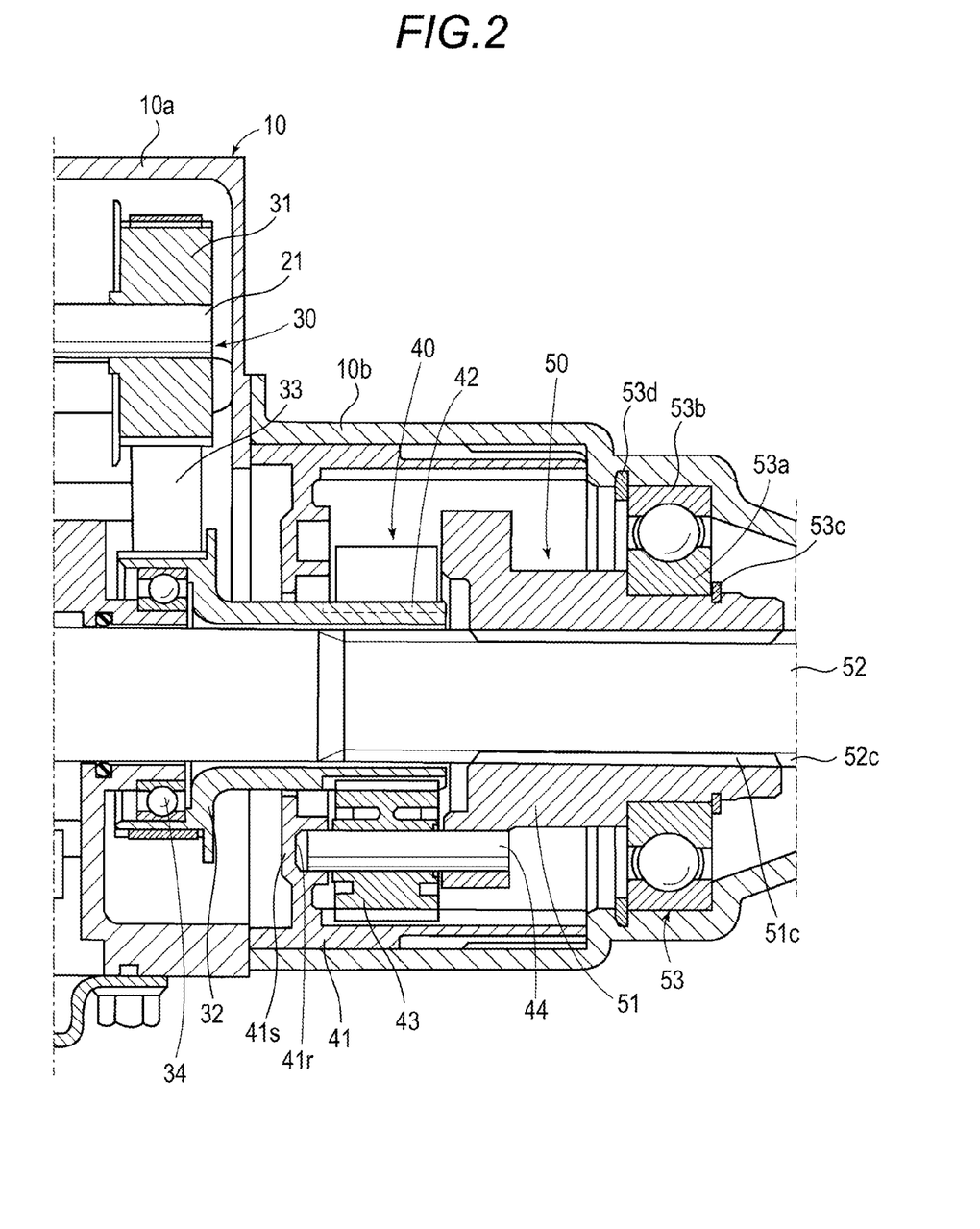
FIG. 2 is an enlarged longitudinal sectional view illustrating the portion of a planetary gear mechanism according to the embodiment disclosed herein.

In the embodiment, as illustrated in FIGS. 1 and 2, a feed screw mechanism is disposed such that a male screw portion 52c, which has trapezoidal screws and is formed in an outer circumferential surface of the other end portion of the rod 52 across a predetermined axial length, is screwed to a female screw portion 51c formed in an inner circumferential surface of a nut member 51. The screw type is not limited to a trapezoidal screw, and a ball screw or the like may be used. The nut member 51 and the rod 52 form the linear motion mechanism 50, and the linear motion mechanism 50 converts rotational motion of the nut member 51 into linear motion of the rod 52. A support structure for supporting the nut member 51 and the rod 52 via the housing 10 will be described later.

In the electric motor 20 of the embodiment, an output shaft 21 is rotatably supported by an attachment portion 20a joined to the body portion 10a of the housing 10, and a tip portion of the output shaft 21 extending out from the inside of the body portion 10a is connected to a drive pulley 31 of the belt type speed reduction mechanism 30. The electric motor 20 in the embodiment includes a brush 22, and may be a brushless motor.

The belt type speed reduction mechanism 30 in the embodiment includes the drive pulley 31 that is connected to the output shaft 21 of the electric motor 20; a driven pulley 32 which is connected to the nut member 51 and is supported by the housing 10 such that the driven pulley 32 can be rotated around the axis of the rod 52; and a belt 33 that is provided in a tensed state between the driven pulley 32 and the drive pulley 31. The belt type speed reduction mechanism 30 is configured such that the speed of an output of the electric motor 20 is reduced and the reduced output is transmitted to the linear motion mechanism 50 via the planetary gear mechanism 40. As illustrated in FIGS. 1 and 2, the driven pulley 32 has a hollow shape, is disposed coaxially with the rod 52, and is rotatably supported by the body portion 10a of the housing 10 via a bearing 34. External teeth are formed in each of the driven pulley 32 and the drive pulley 31, and internal teeth are formed in the belt 33. The driven pulley 32, the drive pulley 31, and the belt 33 are disposed such that both the external teeth and the internal teeth mesh with each other.

In the embodiment, the planetary gear mechanism 40 is mounted between the belt type speed reduction mechanism 30 and the linear motion mechanism 50. The planetary gear mechanism 40 is configured such that the speed of an output of the belt type speed reduction mechanism 30 is reduced and the reduced output is transmitted to the linear motion mechanism 50. The planetary gear mechanism 40 is configured to include a ring gear 41 that is non-rotatably supported inside of the housing 10; a sun gear 42 that is rotated integrally with the driven pulley 32; a planetary gear 43 that meshes with the ring gear 41 and the sun gear 42; and a pin 44 that rotatably supports the planetary gear 43 and is fixed to the nut member 51. The pin 44 and the like will be described in detail later with reference to FIGS. 2 to 4. The sun gear 42 in the embodiment is formed integrally with a shaft portion of the driven pulley 32; however, the sun gear 42 may be formed as a separate member, and be joined to the shaft portion of the driven pulley 32 such that the sun gear 42 is rotated integrally with the driven pulley 32.

The nut member 51 of the linear motion mechanism 50 is rotatably supported by the support portion 10b of the housing 10 via a bearing 53. The nut member 51 supports the planetary gear 43 such that the planetary gear 43 can be rotated around the pin 44, and the nut member 51 serves as a carrier. The bearing 53 is a ball bearing. An inner race 53a of the bearing 53 is fitted to an outer circumferential surface of the nut member 51, and is held by a C-shaped snap ring 53c. An outer race 53b of the bearing 53 is fitted to an inner circumferential surface of the support portion 10b, and is held by a C-shaped snap ring 53d.

In contrast, as illustrated in FIG. 1, the rod 52 is supported by the body portion 10a of the housing 10 via a pair of bushes B such that the rod can be moved (and cannot be rotated) in an axial direction. An axial load applied to the rod 52 is absorbed by the housing 10 via the nut member 51, the bearing 53, and the snap rings 53c and 53d. A nut 52d for preventing falling off of components is screwed to a tip of the male screw portion 52c of the rod 52, and a magnetic member 62 is screw-fixed to an intermediate portion of the rod 52.

The magnetic member 62 is close to a displacement sensor 61, and is accommodated in the body portion 10a of the housing 10. The displacement sensor 61 is supported by an electronic circuit substrate 63, and forms an electronic control device 60. The magnetic member 62 has a function of detecting an axial displacement of the rod 52 during linear motion of the rod 52, and a function of preventing rotation of the rod 52 via contact with an inner surface of the body portion 10a.

In the rear wheel steering apparatus of the embodiment, when the electric motor 20 is driven and rotated by the electronic control device 60, the speed of a rotational output of the electric motor 20 is reduced by the belt type speed reduction mechanism 30 and the planetary gear mechanism 40, the nut member 51 is driven and rotated, and rotational motion of the nut member 51 is converted into linear motion of the rod 52 by the linear motion mechanism 50. Accordingly, the distance between the first connection member 11 and the second connection member 12 is increased and decreased such that a steering angle of the rear wheels is adjusted.

As illustrated in an enlarged manner in FIG. 2 the planetary gear mechanism 40 in the embodiment includes the columnar pin 44 that rotatably supports the planetary gear 43 and is fixed to the nut member 51, and a partition wall portion 41s that separates the driven pulley 32 from the planetary gear 43 and prevents the planetary gear 43 from being axially moved a predetermined distance or longer. In the embodiment, the partition wall portion 41s is formed integrally with the ring gear 41, includes an annular recessed portion 41r around the axis of the rod 52 which is formed in a surface of the partition wall portion 41s which faces the planetary gear 43, and is disposed such that a tip portion of the pin 44 is freely fitted into the recessed portion 41r. The partition wall portion 41s is capable of reliably preventing infiltration of grease from the inside of the planetary gear mechanism 40 to the belt type speed reduction mechanism 30. The partition wall portion 41s may be formed separately from the ring gear 41.

Figure 3:
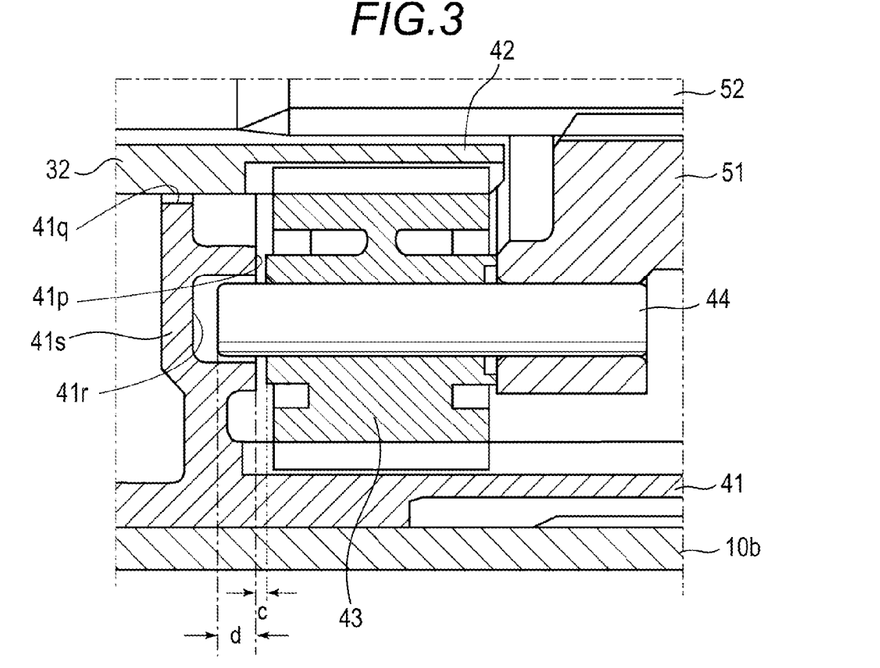
FIG. 3 is an enlarged longitudinal sectional view illustrating the portion of a ring gear and a planetary gear which are used in the planetary gear mechanism according to the embodiment disclosed herein.

In the embodiment, as illustrated in an enlarged manner in FIG. 3, an axial distance (d) of the pin 44 between a side surface 41p of the partition wall portion 41s, which faces the planetary gear 43, and an end surface of the tip portion of the pin 44 is set to be larger than a gap (c) between the side surface 41p and the planetary gear 43 (d>c). The planetary gear 43 including end surfaces is reliably supported by the pin 44, and the partition wall portion 41s prevents the planetary gear 43 from falling off from the pin 44. In other words, the partition wall portion 41s serves as a retainer which prevents axial movement of the planetary gear 43.

Figure 4:
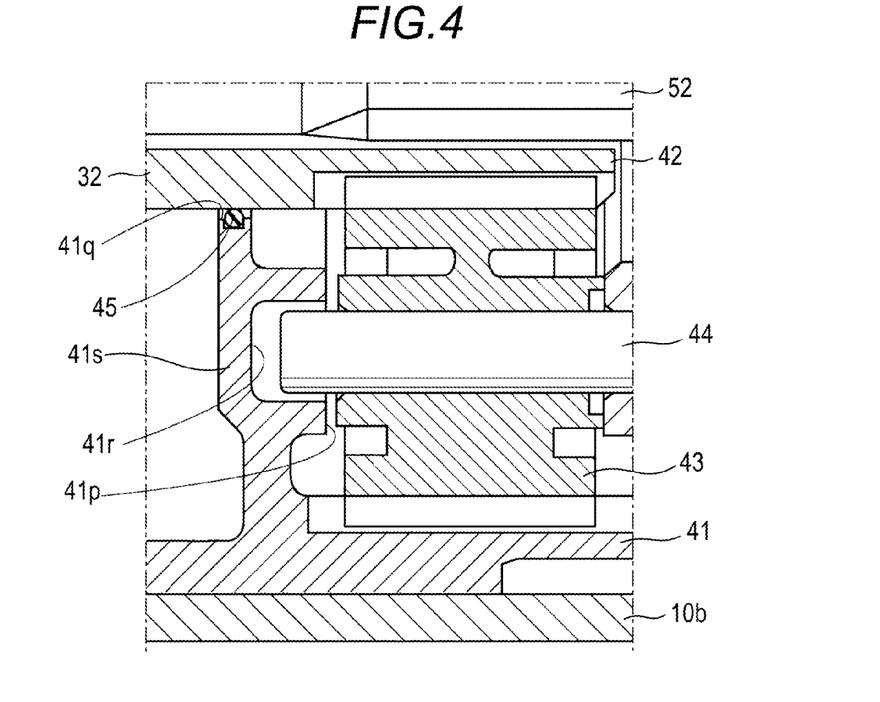
FIG. 4 is a longitudinal sectional view illustrating another example of the portion of a ring gear used in the planetary gear mechanism according to the embodiment disclosed herein.

The partition wall portion 41s includes an opening 41q into which a shaft portion of the driven pulley 32 (formed integrally with the sun gear 42) is inserted. As ascertained from FIG. 3, there is a void between the opening 41q and the driven pulley 32; however, there is a low possibility of infiltration of grease to the belt type speed reduction mechanism 30 via the void. In addition, as illustrated in FIG. 4, a seal member 45 may be mounted between the opening 41q of the partition wall portion 41s and the driven pulley 32 so as to block the void. An O-ring illustrated in FIG. 4 or a so-called dust seal may be used as the seal member 45.

In the belt type speed reduction mechanism 30, it is possible to properly select and replace the drive pulley 31 and the belt 33, and it is possible to provide a rear wheel steering apparatus having different output characteristics by chaining the drive pulley 31 and the belt 33. That is, since the reduction gear ratio of the belt type speed reduction mechanism 30 is determined by a ratio in the number of teeth between the drive pulley 31 and the driven pulley 32, it is possible to change the reduction gear ratio by changing the number of teeth of the drive pulley 31 and the number of teeth of the belt 33 in a state where the axis-to-axis pitch between the output shaft 21 of the electric motor 20 and the rod 52 is fixed.

Figure 5:
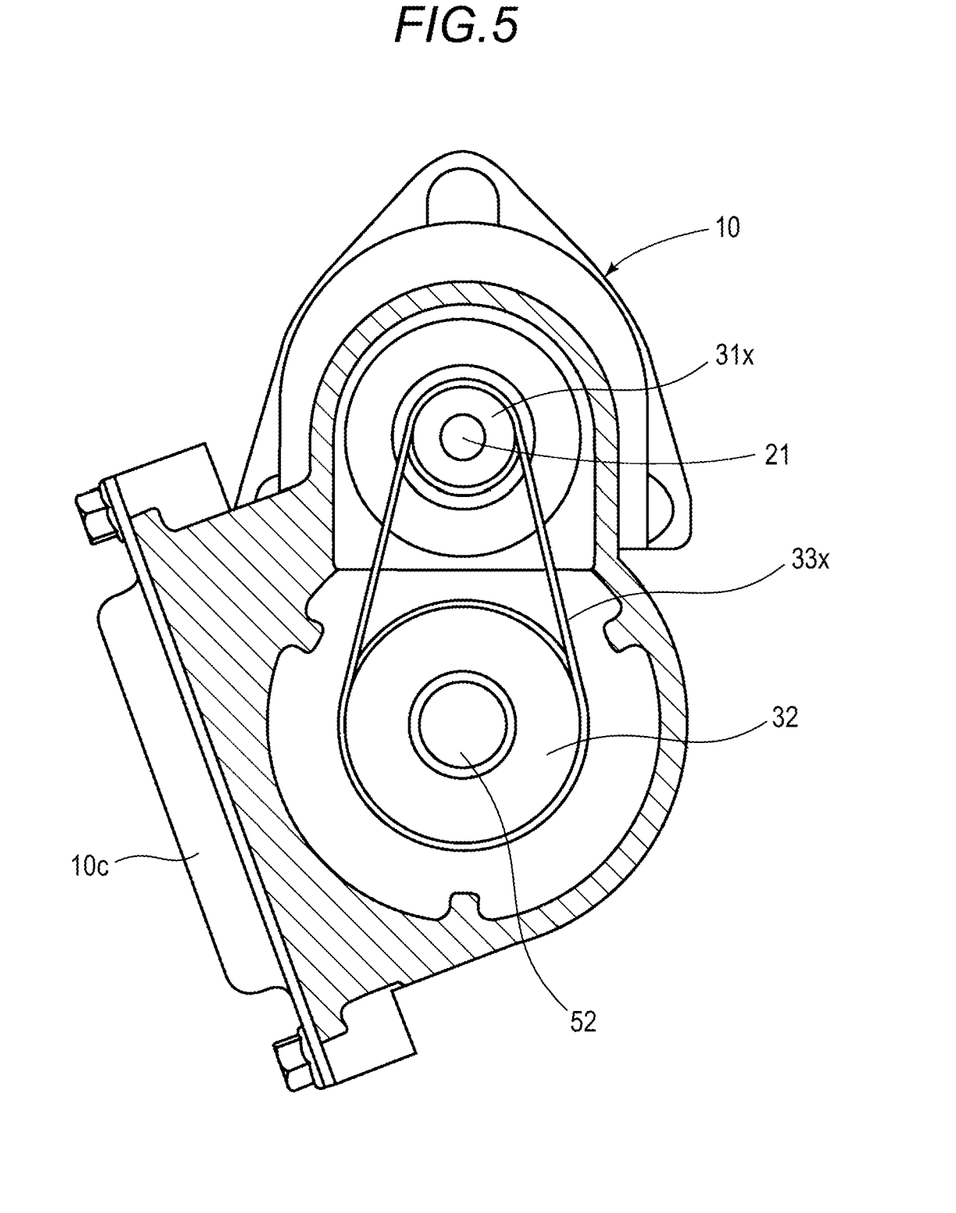
FIG. 5 is a longitudinal sectional view illustrating the configuration of a high-thrust rear wheel steering apparatus according to the embodiment disclosed herein.
Figure 6:
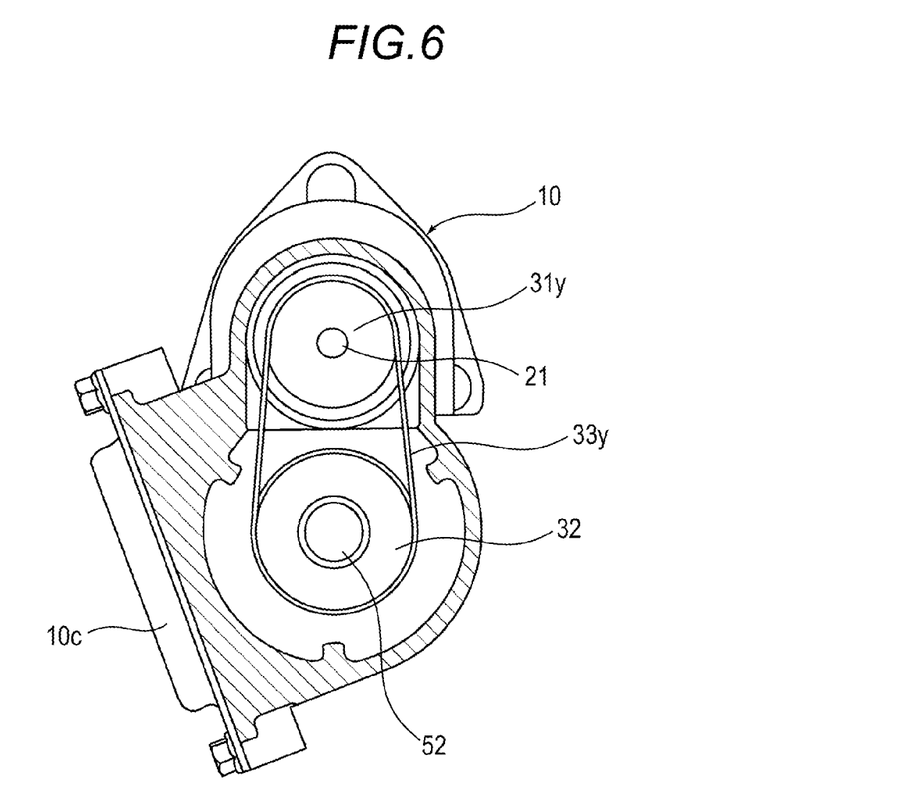
FIG. 6 is a longitudinal sectional view illustrating the configuration of a high-speed rear wheel steering apparatus according to the embodiment disclosed herein.

For example, as illustrated in FIG. 5, it is possible to build a high-thrust rear wheel steering apparatus by using a drive pulley 31x having a diameter smaller than that of the drive pulley 31 in FIG. 1, and a belt 33x adapted for the drive pulley 31x while maintaining the same driven pulley 32 in FIG. 1. In contrast, as illustrated in FIG. 6, it is possible to build a high-speed rear wheel steering apparatus by using a drive pulley 31y having a diameter larger than that of the drive pulley 31 in FIG. 1, and a belt 33y adapted for the drive pulley 31y. Other configuration components are common between the examples illustrated in FIGS. 5 and 6, and the axis-to-axis pitch between the drive pulley 31x and the driven pulley 32 and between the drive pulley 31y and the driven pulley 32. As described above, it is possible to set output characteristics (thrust and speed of the rod 52) of the actuator in a wide range from high-speed characteristics to high-thrust characteristics by changing only two components such as the drive pulley 31 and the belt 33 while maintaining the maximum output in a constant range.

Figure 7:
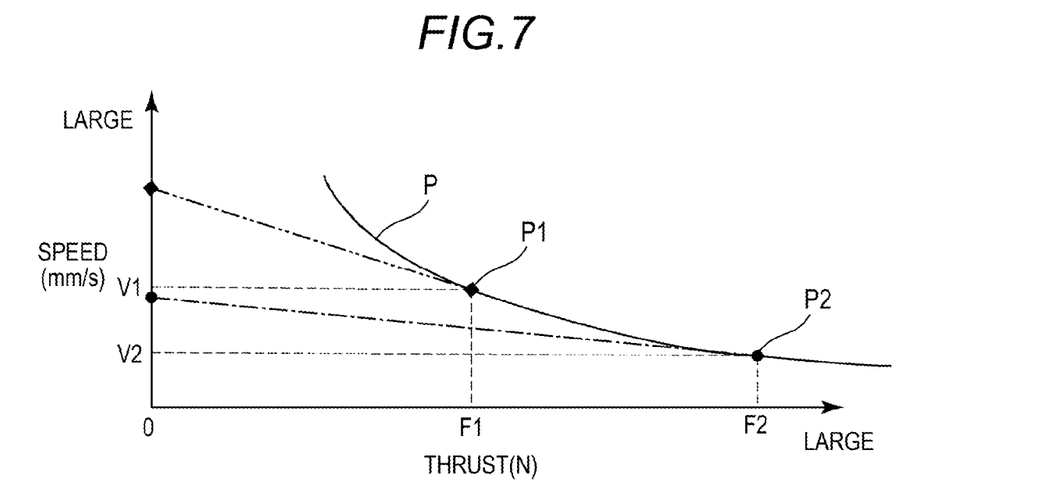
FIG. 7 is a graph illustrating output characteristics of an actuator according to the embodiment disclosed herein.

FIG. 7 is a graph illustrating the output characteristics of the actuator that is formed of the electric motor 20, the belt type speed reduction mechanism 30, the planetary gear mechanism 40, and the linear motion mechanism 50. The horizontal axis represents thrust of the rod 52, and the vertical axis represents speed. The maximum output (P) of the actuator is calculated as the product of the maximum thrust (F) and a speed (V) at the maximum thrust. Since the electric motor 20, the planetary gear mechanism 40, and the linear motion mechanism 50 are common between the examples illustrated in FIGS. 5 and 6, the maximum output of the actuator is not dependent on the reduction gear ratio of the belt type speed reduction mechanism 30 and is substantially constant (strictly speaking, there is a slight difference in a belt transmission efficiency due to a difference in the reduction gear ratio, or there is a slight difference in a feed screw efficiency due to a difference in input torque or a rotational speed). It is possible to change the output characteristics while maintaining the maximum output in the constant range.

For example, in FIG. 7, it is possible to set a high-speed output P1 (=F1×V1) illustrated by a two point chain line and a high-thrust output P2 (=F2×V2) illustrated by the alternating one long and two short dashes line with respect to the constant maximum output P1 illustrated by the solid line such that P1 becomes equal to P2. Accordingly, the output characteristics of the actuator are not limited to P1 and P2, and it is possible to arbitrarily set the output characteristics in a range in which an output Px is equal to P (constant) by setting the reduction gear ratio of the belt type speed reduction mechanism 30.

In the embodiment, the first connection member 11 is formed integrally with the support portion 10b of the housing 10, and the second connection member 12 is connected to the rod 52. Alternatively, it is possible to build a double side (right and left) expansion and contraction type actuator in a case where both ends of the rod 42 can be respectively connected to first and second connection members (ball joints BJ). That is, since as described above, the driven pulley 32 has a hollow shape, the rod 52 is coaxially disposed inside the driven pulley 32, and the electric motor 20, the belt type speed reduction mechanism 30, the planetary gear mechanism 40, and the linear motion mechanism 50 can become common (it is necessary to slightly change the rod 52), as illustrated in FIG. 8, it is possible to build a double side expansion and contraction type actuator with the minimum component change.

Figure 8:
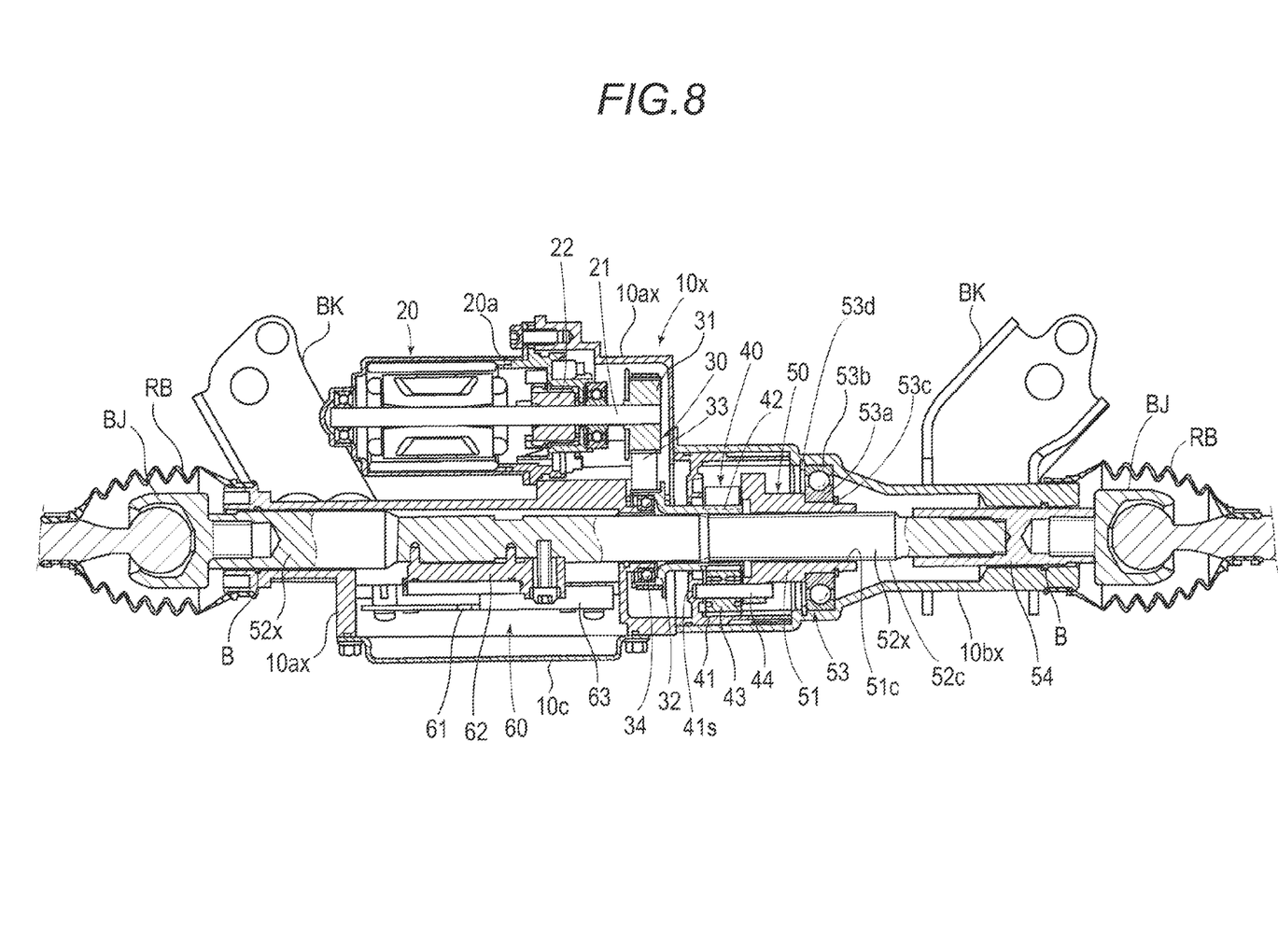
FIG. 8 is a longitudinal sectional view illustrating a rear wheel steering apparatus according to another embodiment disclosed herein.

In FIG. 8, unlike the rod 52 in FIG. 1, a rod 52x extends out from both right and left sides of a housing 10x, and both end portions of the rod 52x are respectively connected to the ball joints BJ. A body portion 10ax and a support portion 10bx of the housing 10x are fixed to a vehicle frame (not illustrated) via brackets BK. One end portion of the rod 52x is supported by the body portion 10ax such that the rod 52x can be moved in an axial direction. A coupling member 54, through which the other end portion of the rod 52x is connected to the ball joint BJ, is supported by the support portion 10bx such that the coupling member 54 can be moved in the axial direction. Since other configuration elements are the same as those in the embodiment illustrated in FIG. 1, the same reference signs as in FIG. 1 are assigned to substantially the same configuration elements, and description thereof will be omitted.

As described above, in the embodiment illustrated in FIG. 8, the housing 10x, the bracket BK, and the like related to a support structure of these components with respect to the vehicle frame are different from those in the embodiment illustrated in FIG. 1, and in contrast, the electric motor 20, the belt type speed reduction mechanism 30, the planetary gear mechanism 40, and the linear motion mechanism 50 (excluding the rod 52x) can become common. As a result, it is possible to build a single side expansion and contraction type actuator and a double side expansion and contraction type actuator with the minimum component change.

An aspect of this disclosure is directed to a vehicle rear wheel steering apparatus that steers rear wheels of a vehicle, the apparatus including: a housing that is supported by the rear wheels via a first connection member and a second connection member; an electric motor that is supported by the housing; a speed reduction mechanism that is connected to an output shaft of the electric motor, and reduces the speed of an output of the electric motor; and a linear motion mechanism that includes a nut member which is connected to the speed reduction mechanism, and a rod which is screwed to the nut member and is connected to at least one of the first connection member and the second connection member, and that converts rotational motion of the nut member into linear motion of the rod. The speed reduction mechanism includes a planetary gear mechanism including: a drive pulley that is connected to the output shaft of the electric motor; a driven pulley which is connected to the nut member, and is supported by the housing such that the driven pulley can be rotated around an axis of the rod; a belt that is provided in a tensed state between the drive pulley and the driven pulley; a sun gear that is rotated integrally with the driven pulley; a ring gear that is non-rotatably supported inside of the housing; a planetary gear that meshes with the ring gear and the sun gear; a columnar pin that rotatably supports the planetary gear and is fixed to the nut member; and a partition wall portion that separates the driven pulley from the planetary gear, and prevents the planetary gear from being axially moved a predetermined distance or longer. The speed of an output of the electric motor is reduced and the reduced output is transmitted to the linear motion mechanism via the drive pulley, the belt, the driven pulley, and the planetary gear mechanism.

In the vehicle rear wheel steering apparatus, the partition wall portion may be formed integrally with the ring gear, include an annular recessed portion formed around the axis of the rod in a surface of the partition wall portion which faces the planetary gear, and be disposed such that a tip portion of the pin is freely fitted into the recessed portion. Particularly, an axial distance of the pin between a side surface of the partition wall portion, which faces the planetary gear, and an end surface of the tip portion of the pin may be set to be larger than a gap between the side surface and the planetary gear.

In the vehicle rear wheel steering apparatus, the partition wall portion may include an opening into which a shaft portion of the driven pulley is inserted, and include a seal member that is mounted between the opening and the driven pulley.

In the vehicle rear wheel steering apparatus, the first connection member may be fixed to the housing, and the second connection member may be connected to the rod. Alternatively, the first connection member and the second connection member may be respectively connected to both ends of the rod.

The aspect of this disclosure has the aforementioned configuration, and thus, it is possible to obtain the following effects. That is, a rear wheel steering apparatus of this disclosure including: a housing that is supported by rear wheels via a first connection member and a second connection member; an electric motor that is supported by the housing; a speed reduction mechanism that is connected to an output shaft of the electric motor, and reduces the speed of an output of the electric motor; and a linear motion mechanism that includes a nut member which is connected to the speed reduction mechanism, and a rod which is screwed to the nut member and is connected to at least one of the first connection member and the second connection member, and that converts rotational motion of the nut member into linear motion of the rod. The speed reduction mechanism includes a planetary gear mechanism including: a drive pulley that is connected to the output shaft of the electric motor; a driven pulley which is connected to the nut member, and is supported by the housing such that the driven pulley can be rotated around an axis of the rod; a belt that is provided in a tensed state between the drive pulley and the driven pulley; a sun gear that is rotated integrally with the driven pulley; a ring gear that is non-rotatably supported inside of the housing; a planetary gear that meshes with the ring gear and the sun gear; a columnar pin that rotatably supports the planetary gear and is fixed to the nut member; and a partition wall portion that separates the driven pulley from the planetary gear, and prevents the planetary gear from being axially moved a predetermined distance or longer. The speed of an output of the electric motor is reduced and the reduced output is transmitted to the linear motion mechanism via the drive pulley, the belt, the driven pulley, and the planetary gear mechanism. As a result, it is possible to build an apparatus via a small change in components, which satisfies various output characteristics changing according to the type of a suspension, a vehicle weight, a tire size, and the like. It is possible to reduce manufacturing costs by using common components and common manufacturing lines. Specifically, it is possible to change the output characteristics by changing only two components such as the drive pulley and the belt, and it is possible to properly support the planetary gear via the pin and to reliably maintain a support state. As a result, it is possible to easily provide an apparatus having various output characteristics at a low cost. Particularly, since it is possible to use a general-purpose columnar pin, it is possible to further reduce the cost. The partition wall portion is capable of reliably preventing infiltration of grease from the inside of the planetary gear mechanism to the driven pulley.

In a case where the partition wall portion is formed integrally with the ring gear, includes an annular recessed portion formed around the axis of the rod in a surface of the partition wall portion which faces the planetary gear, and is disposed such that a tip portion of the pin is freely fitted into the recessed portion, it is possible to properly support the pin, and to reliably prevent infiltration of grease from the inside of the planetary gear mechanism to the driven pulley via implementation of a simple configuration. Particularly, in a case where an axial distance of the pin between a side surface of the partition wall portion, which faces the planetary gear, and an end surface of the tip portion of the pin is set to be larger than a gap between the side surface and the planetary gear, the partition wall portion serves as a retainer which prevents axial movement of the planetary gear, and thus, it is possible to reliably prevent the planetary gear from falling out from the pin.

In a case where in the rear wheel steering apparatus, the partition wall portion includes an opening into which a shaft portion of the driven pulley is inserted, and includes a seal member that is mounted between the opening and the driven pulley, it is possible to more reliably prevent infiltration of grease from the inside of the planetary gear mechanism to the driven pulley. It is possible to use an O-ring or a so-called dust seal as the seal member.

In a case where in the rear wheel steering apparatus, the first connection member is fixed to the housing, and the second connection member is connected to the rod, a single side expansion and contraction type apparatus can be built. Alternatively, in a case where in the vehicle rear wheel steering apparatus, the first connection member and the second connection member are respectively connected to both ends of the rod, a double side expansion and contraction type apparatus can be built. Since main components such as the electric motor, the speed reduction mechanism, and the linear motion mechanism can become common between both the single side expansion and contraction type apparatus and the double side expansion and contraction type apparatus, it is possible to reduce manufacturing costs, and to provide an apparatus having various output characteristics at a low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle rear wheel steering apparatus comprising:
a housing configured to be supported by the rear wheels via a first connection member and a second connection member;
an electric motor that is supported by the housing;
a speed reduction mechanism that is connected to an output shaft of the electric motor, and reduces a speed of an output of the electric motor; and
a linear motion mechanism that includes a nut member which is connected to the speed reduction mechanism, and a rod which is screwed to the nut member and is connected to at least one of the first connection member and the second connection member, and that converts rotational motion of the nut member into linear motion of the rod,
wherein the speed reduction mechanism includes a planetary gear mechanism including: a drive pulley that is connected to the output shaft of the electric motor; a driven pulley which is connected to the nut member, and is supported by the housing such that the driven pulley can be rotated around an axis of the rod; a belt that is provided in a tensed state between the drive pulley and the driven pulley; a sun gear that is rotated integrally with the driven pulley; a ring gear that is non-rotatably supported inside of the housing; a planetary gear that meshes with the ring gear and the sun gear; a columnar pin that rotatably supports the planetary gear and is fixed to the nut member; and a partition wall portion that separates the driven pulley from the planetary gear, and prevents the planetary gear from being axially moved a predetermined distance or longer, and
wherein the output of the electric motor is reduced via the drive pulley, the belt, the driven pulley, and the planetary gear mechanism, and the reduced output of the electric motor is transmitted to the linear motion mechanism.

2. The vehicle rear wheel steering apparatus according to claim 1,
wherein the partition wall portion is formed integrally with the ring gear, includes an annular recessed portion formed around an axis of the rod in a surface of the partition wall portion which faces the planetary gear, and is disposed such that a tip portion of the pin is freely fitted into the recessed portion.

3. The vehicle rear wheel steering apparatus according to claim 2,
wherein an axial distance of the pin between a side surface of the partition wall portion, which faces the planetary gear, and an end surface of the tip portion of the pin is set to be larger than a gap between the side surface and the planetary gear.

4. The vehicle rear wheel steering apparatus according to claim 1,
wherein the partition wall portion includes an opening into which a shaft portion of the driven pulley is inserted, and includes a seal member that is mounted between the opening and the driven pulley.

5. The vehicle rear wheel steering apparatus according to claim 1,
wherein the first connection member is fixed to the housing, and the second connection member is connected to the rod.

6. The vehicle rear wheel steering apparatus according to claim 1,
wherein the first connection member and the second connection member are respectively connected to both ends of the rod.

* * * * *